United States Patent
Puerta Velasquez et al.

(10) Patent No.: US 9,957,582 B2
(45) Date of Patent: May 1, 2018

(54) PRECOATED SHEETS FOR MANUFACTURING PRESS-HARDENED COATED STEEL PARTS

(71) Applicant: ArcelorMittal, Luxembourg (LU)

(72) Inventors: Juan David Puerta Velasquez, Metz (FR); Jonas Staudte, Montigny-les-Metz (FR); Pascal Drillet, Rozerieulles (FR)

(73) Assignee: ArcelorMittal, Luxembourg (LU)

( * ) Notice: Subject to any disclaimer, the term of this patent is extended or adjusted under 35 U.S.C. 154(b) by 0 days. days.

(21) Appl. No.: 15/609,841

(22) Filed: May 31, 2017

(65) Prior Publication Data

US 2017/0260599 A1 Sep. 14, 2017

Related U.S. Application Data

(62) Division of application No. 14/426,523, filed as application No. PCT/IB2013/001914 on Sep. 6, 2013.

(30) Foreign Application Priority Data

Sep. 6, 2012 (WO) .............. PCT/FR2012/000350

(51) Int. Cl.
  *C22C 38/02* (2006.01)
  *C22C 38/04* (2006.01)
  (Continued)

(52) U.S. Cl.
  CPC .......... *C21D 8/0278* (2013.01); *B32B 15/012* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0236* (2013.01); *C21D 8/0257* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/06* (2013.01); *C23C 2/12* (2013.01); *C23C 2/28* (2013.01)

(58) Field of Classification Search
  CPC .......................... C22C 38/02; C22C 38/0432
  USPC .......................................... 148/333; 428/457
  See application file for complete search history.

(56) References Cited

U.S. PATENT DOCUMENTS

| 6,296,805 | B1 | 10/2001 | Laurent et al. |
| 6,564,604 | B2 | 5/2003 | Kefferstein et al. |

(Continued)

FOREIGN PATENT DOCUMENTS

| DE | 1294402 | 5/2008 |
| FR | 2780984 | 1/2000 |

(Continued)

*Primary Examiner* — Brian Walck
(74) *Attorney, Agent, or Firm* — Davidson, Davidson & Kappel, LLC; Jennifer L. O'Connell; William C. Gehris (57) ABSTRACT

A cold-rolled sheet is provided. The cold-rolled sheet includes a steel substrate with a carbon content $C_0$ between 0.07% and 0.5%, expressed by weight, and a metal pre-coating on at least the two principal faces of the steel substrate. The substrate has a decarburized area on the surface of each of the two principal faces. The depth $p_{50\%}$ of the decarburized area is between 6 and 30 micrometers, and $p_{50\%}$ is the depth at which the carbon content is equal to 50% of the content $C_0$. The sheet does not contain a layer of iron oxide between the substrate and the metal pre-coating.

6 Claims, 8 Drawing Sheets

(51) Int. Cl.
  *C22C 38/32* (2006.01)
  *C21D 8/02* (2006.01)
  *B32B 15/01* (2006.01)
  *C23C 2/28* (2006.01)
  *C22C 38/28* (2006.01)
  *C22C 38/06* (2006.01)
  *C22C 38/00* (2006.01)
  *C21D 6/00* (2006.01)
  *C23C 2/12* (2006.01)
  *C23C 2/06* (2006.01)

(56) References Cited

U.S. PATENT DOCUMENTS

| | | |
|---|---|---|
| 7,687,152 B2 | 3/2010 | Ikematsu et al. |
| 7,867,344 B2 | 1/2011 | Kusumi et al. |
| 2001/0042393 A1 | 11/2001 | Kefferestein et al. |
| 2010/0050730 A1 | 3/2010 | Buschsieweke et al. |
| 2010/0193081 A1 | 8/2010 | Mataigne et al. |
| 2011/0076477 A1 | 3/2011 | Brandstaetter et al. |
| 2016/0222486 A1 | 8/2016 | Moulin et al. |

FOREIGN PATENT DOCUMENTS

| | | |
|---|---|---|
| FR | 2807447 | 10/2001 |
| JP | H04276057 | 10/1992 |
| JP | 2001234290 | 8/2001 |
| JP | 2006104546 | 4/2006 |
| JP | 2010043323 | 2/2010 |
| KR | 100760152 | 6/2006 |
| WO | WO2009080292 | 7/2009 |

PRECOATED SHEETS FOR MANUFACTURING PRESS-HARDENED COATED STEEL PARTS

This is a divisional of U.S. patent application Ser. No. 14/426,523, filed Mar. 6, 2015 which is a National Stage of International Application PCT/IB2013/001914, filed Sep. 6, 2013 which claims priority to International Application PCT/FR2012/000350, filed Sep. 6, 2012. All of the above applications are hereby incorporated by reference herein.

This invention relates to a process for the fabrication of parts from a steel sheet cold-rolled and annealed, pre-coated, heated, stamped and then hardened during cooling by holding it inside a press tool; these parts are intended in particular to be used as structural elements in automotive vehicles to perform anti-intrusion or energy absorption functions. Parts of this type can also be used, for example, for the fabrication of tools or parts of agricultural machines.

BACKGROUND

In this type of application, the goal is to manufacture steel parts that combine high mechanical strength, high impact strength, good corrosion resistance and good dimensional accuracy. This combination is particularly desirable in the automobile industry, where attempts are being made to significantly reduce the weight of the vehicles. Anti-intrusion and structural parts, as well as other parts that contribute to the safety of automotive vehicles such as bumpers, door or center pillar reinforcements, for example, require the above mentioned characteristics, for example. This weight reduction can be achieved in particular thanks to the use of steel parts with a martensitic or bainitic-martensitic microstructure.

The fabrication of parts of this type is described in prior art publications FR2780984 and FR2807447, according to which a blank cut in a steel sheet for heat treatment and pre-coated with a metal or metal alloy is heated in a furnace and then hot formed. The pre-coating can be aluminum or an aluminum-based alloy, zinc or a zinc alloy. During the heating in the furnace, the pre-coating provides protection for the surface of the steel against decarburization and the formation of calamine. During the heating in the furnace, this pre-coating becomes alloyed with the steel substrate to form a compound suitable for hot forming and that does not cause any deterioration of the tooling. Holding the part in the tooling after forming has been performed makes possible a rapid cooling that leads to the formation of hardened microstructures that have very high mechanical characteristics. A process of this type is known as press hardening.

As a rule, the mechanical characteristics of the parts obtained in this manner are evaluated by means of tensile strength and hardness tests. The above referenced documents also describe fabrication processes that make it possible to obtain a mechanical strength (or maximum tensile strength) Rm of 1500 MPa starting with a steel blank that has an initial strength Rm of 500 MPa before heating and rapid cooling.

However, the service conditions of certain hardened and coated parts require not only a high level of strength Rm but also good bendability. This parameter does in fact appear to be more pertinent than the measured elongation at failure in traction to guarantee that the part has sufficient ductility to absorb deformations or impacts without risk of rupture, in particular in the areas corresponding to local stress concentrations due to the geometry of the part or to the potential presence of micro-defects on the surface of the parts.

Document WO2009080292 discloses a process that makes it possible to increase the bending angle of a hardened part. According to this process, a steel sheet is heated in an annealing furnace to a temperature between 650 and 800° C. to obtain a layer of oxide that is significantly thicker than 0.3 micrometers. Certain alloy elements of the steel are oxidized underneath this oxide layer. This oxide layer is then partly reduced so that it has a thickness greater than 0.3 micrometers. The extreme surface of the reduced oxide layer consists of pure iron. The sheet is then coated using a hot-dip process. After this step, the sheet has the following different layers in succession: the steel substrate comprising the oxidized elements in the vicinity of the surface (internal oxidation), this substrate being topped by a partly reduced oxide layer, which is itself topped by the coating applied using a hot-dip process. During the subsequent step of the austenitization of the blank and/or during the shaping and cooling, a thin ductile layer is formed under the coating such that the cracks formed during the coating propagate less easily into this underlying layer during the forming process.

However, the layer of oxides that is present when the sheet is immersed in the metal coating bath can have an undesirable effect in terms of the adherence of the hot-dip coating to this layer.

It would therefore be desirable to have a fabrication process that does not have this disadvantage and that would make it possible to obtain simultaneously, after press hardening, high levels of tensile strength and bendability.

It is also known that industrial fabrication conditions inevitably include a certain variability such as, for example, of the temperature cycle during the annealing of the sheet before it is coated, and the composition and/or the dew point of the atmosphere of the continuous annealing furnaces, which can vary slightly during a given fabrication sequence or can vary from one fabrication run to another. Even if the maximum precautions are taken to minimize these variations, it would be desirable to have a fabrication process such that the mechanical characteristics, and in particular the bendability, obtained after press hardening are as insensitive as possible to this potential variation of the fabrication conditions. An additional objective is a fabrication process that results in good isotropy of the parts after hot stamping, i.e., in which the bendability is not highly dependent on the direction of stress in relation to the direction in which the sheet is rolled.

It is also known that the hold time of the blanks in the furnace during the austenitization step during hot stamping can influence the mechanical characteristics of the parts. It would therefore be desirable to have a fabrication process that is less sensitive to the hold time in the furnace to achieve a high level of reproducibility of the mechanical characteristics of the parts.

In the case of parts fabricated from sheets pre-coated with zinc or zinc alloy, the objective is to have a process that makes it possible to weld these parts without the risk of embrittlement of the grain boundaries caused by penetration of liquid zinc.

SUMMARY OF THE INVENTION

An object of this invention is to solve the problems cited above by means of an economical fabrication process.

Surprisingly, the inventors have shown that a high bendability of the parts is achieved when a decarburized area of a specific thickness is present underneath the metal pre-coating, before the press hardening of the part. Surprisingly, this specific decarburization before hardening produces bending results that are not dependent to a great extent on the continuous annealing conditions before coating and that reflect good isotropy in relation to the rolling direction; high bending values are achieved in spite of the presence of oxides in this decarburized area, which corresponds to an oxygen enrichment in this area.

For this purpose the present invention provides a cold-rolled sheet that is annealed and pre-coated for the fabrication of press hardened parts, composed of a steel substrate for heat treatment with a carbon content $C_0$ between 0.07% and 0.5%, whereby this content is expressed by weight, and a metal pre-coating on at least one of the two principal faces of the steel substrate, characterized in that the substrate comprises a decarburized area on the surface of each of the two principal faces, whereby the depth $p_{50\%}$ of the decarburized area is between 6 and 30 micrometers, whereby $p_{50\%}$ is the depth at which the carbon content is equal to 50% of the content $C_0$, and in that the sheet does not contain a layer of iron oxide between the substrate and the metal pre-coating. The depth $p_{50\%}$ of the decarburized area is advantageously between 9 and 30 micrometers, and very advantageously between 12 and 30 micrometers.

In one preferential embodiment, the metal pre-coating of the sheet is aluminum or an aluminum alloy.

In another preferential embodiment, the metal pre-coating is zinc or a zinc alloy.

The metal pre-coating can preferably be composed of a layer of aluminum or an aluminum-based alloy topped by a layer of zinc or a zinc alloy.

The composition of the steel substrate advantageously includes, whereby the contents are expressed by weight: 0.07%≤C≤0.5%, 0.5%≤Mn≤3%, 0.02%≤Si≤0.5%, 0.01%≤Cr≤1%, Ti≤0.2%, Al≤0.25%, S≤0.05%, P≤0.1%, 0.0005%≤B≤0.010%, optionally 0.0005%≤Ca≤0.005%, whereby the remainder of the composition consists of iron and the unavoidable impurities resulting from processing.

Very advantageously, the composition of the steel substrate includes, whereby the contents are expressed by weight: 0.09%≤C≤0.38%, 0.8%≤Mn≤1.5%, 0.1%≤Si≤0.35%, 0.01%≤Cr≤0.3%, 0.02%≤Ti≤0.1%, 0.001%≤Al≤0.25%, S≤0.05%, P≤0.1%, 0.002%≤B≤0.005%, optionally 0.0005% Ca≤0.005%, whereby the remainder of the composition consists of iron and the unavoidable impurities resulting from processing.

In one preferred embodiment, the composition of the steel substrate includes, whereby the contents are expressed by weight: 0.15%≤C≤0.25%.

The steel substrate advantageously has an oxygen content $O_0$ and underneath the interface between the pre-coating and the substrate, at a depth of between 0 and 5 micrometers measured from the interface, an average oxygen content $O_m$, whereby $O_m/O_0$ is greater than 15.

Advantageously, the substrate of the pre-coated steel contains, in an area located between zero and 5 micrometers below the interface between the pre-coating and the substrate, oxides that include at least one element selected from a group consisting of titanium, silicon, manganese, aluminum and chromium, whereby the density of the oxides with a diameter greater than 1 micrometer in this area is greater than 50/mm$^2$.

The present invention additionally provides a process for the fabrication of a coated and hardened steel part comprising the successive steps, according to which a cold-rolled steel sheet is procured for heat treatment having a carbon content $C_0$ between 0.07% and 0.5%. The rolled steel is annealed to obtain, upon completion of the annealing, a decarburization of the surface of the sheet over a depth $p_{50\%}$ between 6 and 30 micrometers, whereby $p_{50\%}$ is the depth at which the carbon content is equal to 50% of said content $C_0$, and to obtain a sheet that has no iron oxide layer on its surface, followed by a pre-coating with metal or a metal alloy on the annealed steel that serves as the substrate. The pre-coated steel is then cut to obtain a blank, the blank is then optionally cold stamped, and then the blank is heated to a temperature $T_R$ in a furnace to give the steel an at least partly austenitic structure. The heated blank is removed from the furnace and is transferred into a press or a forming device, and the blank is then hot formed or hot sized to obtain a part that is then cooled in the press or the forming device to give it a martensitic or bainitic-martensitic microstructure by hardening.

An additional object of the invention is a fabrication process characterized in that the pre-coating is performed continuously using a hot-dip process by passage through a bath.

In one preferred embodiment, the metal pre-coating is aluminum or an aluminum alloy.

The pre-coating is preferably zinc or a zinc alloy.

In one particular embodiment, the metal pre-coating is composed of a layer of aluminum or an aluminum-based alloy topped by a layer of zinc or a zinc alloy.

The depth $p_{50\%}$ is advantageously between 9 and 30 micrometers, and very advantageously between 12 and 30 micrometers.

An additional object of the invention is a process characterized in that the composition of the steel substrate comprises, whereby the contents are expressed by weight: 0.07%≤C≤0.5%, 0.5%≤Mn≤3%, 0.02%≤Si≤0.5%, 0.01%≤Cr≤1%, Ti≤0.2%, Al≤0.25%, S≤0.05%, P≤0.1%, 0.0005%≤B≤0.010%, optionally 0.0005%≤Ca≤0.005%, whereby the remainder of the composition consists of iron and the unavoidable impurities resulting from processing.

In one particular embodiment, the composition of the steel substrate includes, whereby the contents are expressed by weight: 0.09%≤C≤0.38%, 0.8%≤Mn≤1.5%, 0.1%≤Si≤0.35%, 0.01%≤Cr≤0.3%, 0.02%≤Ti≤0.1%, 0.001%≤Al≤0.25%, S≤0.05%, P≤0.1%, 0.002%≤B≤0.005%, optionally 0.0005% ≤Ca≤0.005%, whereby the remainder of the composition consists of iron and the unavoidable impurities resulting from processing.

In one particular embodiment of the process, the composition of the steel substrate comprises: 0.15%≤C≤0.25%.

The temperature $T_R$ is preferably greater than or equal to the temperature $A_{c3}$ of the steel.

The cold-rolled steel sheet preferably has an oxygen content $O_0$; it is annealed to obtain in the substrate, at the conclusion of the annealing, underneath the interface between the pre-coating and the substrate, at a depth of between 0 and 5 micrometers measured from the interface, an average oxygen content $O_m$, whereby $O_m/O_0$ is greater than 15.

Preferably the cold-rolled sheet is annealed to obtain, in the substrate at the conclusion of the annealing, underneath the interface between the pre-coating and the substrate, at a depth located between 0 and 5 micrometers from the interface, oxides that include at least one element selected from a group consisting of titanium, silicon, manganese, aluminum, chromium, whereby the density of the oxides with a diameter greater than 1 micrometer in this area is greater than 50/mm$^2$.

The present invention further provides a fabrication process as described in any one of the embodiments described above, wherein the annealing conditions include the following steps in succession: after having procured the cold-rolled sheet, it is heated as it travels through a radiant tube furnace or a resistance furnace or an induction furnace or a furnace combining at least any two of these means, to a temperature T1a between 600° C. and Ac1+40° C., whereby Ac1 designates the temperature of the start of the austenitic transformation as the steel is heated, in a zone of the furnace where the atmosphere A1 contains from 2 to 15% by volume of hydrogen, preferably 3-5% by volume of hydrogen, the balance being nitrogen and unavoidable impurities, with a dew point between −60 and −15° C. The sheet is then heated from the temperature T1a to a temperature T2a between 720 and 860° C., whereby at least one element selected from among liquid water, steam or oxygen is injected into the furnace starting at the temperature T1a to obtain, in the section of the furnace between the temperature T1a and the temperature T2a, an atmosphere A2a with a dew point PR between −15° C. and the temperature Te of the iron/iron oxide equilibrium dew point, whereby the interval of time between the instant when the sheet is at the temperature T1a and the instant when the sheet reaches the temperature T2a is greater than or equal to 30 seconds. The sheet is then held at a temperature Tm between T2a and T2a+40° C., under an atmosphere A3 which is reductive for iron, and is then cooled to a temperature T3, in an atmosphere A4 such that no surface reoxidation of the iron occurs. The sheet is then pre-coated by hot-dip coating in a metal bath at the temperature Tbm, it being understood that the temperature T3 is between Tbm−10° C. and Tbm+50° C.

Preferably, the dew point PR of the atmosphere A2a is between −15 and +17° C., very preferably between −15 and −10° C.

The present invention also provides a fabrication process in which the annealing conditions include the following steps in succession: after having procured the cold-rolled sheet, it is heated as it travels through a radiant tube furnace or a resistance furnace or an induction furnace or a furnace combining at least any two of these means, to a temperature T1a between 600° C. and Ac1+40° C., whereby Ac1 designates the temperature of the start of the austenitic transformation as the steel is heated, in a zone of the furnace where the atmosphere A1 contains from 2 to 15% by volume of hydrogen, preferably 3-5% by volume of hydrogen, the balance being nitrogen and unavoidable impurities, with a dew point between −60 and −15° C. The sheet is then heated from the temperature T1a to a temperature T2a between 720 and 860° C., whereby at least one element selected from among liquid water, steam or oxygen is injected into the furnace starting at the temperature T1a to obtain, in the section of the furnace between the temperature T1a and the temperature T2a, an atmosphere A2b which is oxidizing for iron, whereby the interval of time between the instant when the sheet is at the temperature T1a and the instant when the sheet reaches the temperature T2a is greater than or equal to 30 seconds. The sheet is then held at a temperature Tm between T2a and T2a+40° C. under an atmosphere A3 which is reductive for iron, whereby the complete reduction of the layer of iron formed in this atmosphere A2b occurs no later than the end of the hold at the temperature Tm. The sheet is then cooled, in an atmosphere A4 such that no surface re-oxidation of the iron occurs, up to a temperature T3, then the sheet is pre-coated by hot-dip coating in a metal bath at the temperature Tbm, it being understood that the temperature T3 is between Tbm−10° C. and Tbm+50° C.

In one advantageous embodiment, the temperature T1a is greater than Ac1, i.e., the austenitic transformation temperature during the heating of the steel substrate.

The present invention even further provides a fabrication process, the annealing conditions of which include the following steps in succession: after having procured a cold-rolled steel sheet, it is pre-heated as it travels through a furnace, the pre-heating being carried out in a zone of a furnace heated by direct flame, whereby the sheet is pre-heated to a temperature T1b between 550 and 750° C. in an atmosphere resulting from the combustion of a mixture of air and natural gas in which the air/gas ratio is between 1 and 1.2. The sheet is heated from the temperature T1b to a temperature T2b between 760 and 830° C. in a second zone of the furnace heated by radiant tubes or by resistances or by induction or by any combination of at least two of these means, in which the atmosphere contains from 3 to 40% by volume of hydrogen, the balance being nitrogen and unavoidable impurities, whereby the dew point is less than −30° C., and whereby the interval of time between the instant when the sheet is at the temperature T1b and the instant when it reaches the temperature T2b is at least 30 seconds. The sheet is held at a temperature Tm between T2b and T2b+40° C., under an atmosphere A3 which is reductive for iron, and is then cooled in an atmosphere, such that no surface re-oxidation of the iron occurs, to a temperature T3. The sheet is then pre-coated by hot-dip coating in a metal bath at the temperature Tbm, it being understood that the temperature T3 is between Tbm−10° C. and Tbm+50° C.

In one preferred embodiment, the temperature T2b is greater than Ac1.

BRIEF DESCRIPTION OF THE DRAWINGS

Additional characteristics and advantages of the invention will be made clear in the following description, which is provided by way of example, and refers to the accompanying figures, in which.

DETAILED DESCRIPTION

The thickness of the cold-rolled sheet used in the process according to a preferred embodiment of the present invention is preferably between approximately 0.5 and 2.6 mm, the thickness range used in, among other applications, the fabrication of structural or reinforcement parts for the automobile industry.

The steel is a steel for heat treatment, i.e., it is a steel capable of hardening after austenitization and rapid cooling by quenching.

The steel advantageously contains the following elements, whereby the composition is expressed by weight:

a carbon content between 0.07 and 0.5%, preferably between 0.09 and 0.38% by weight, and very preferably between 0.15 and 0.25% by weight. This element plays a major role in the hardenability and mechanical strength obtained after the cooling that follows the austenitization treatment. Below a content of 0.07 wt. %, the suitability for hardening is reduced and the mechanical strength is insufficient after press hardening. A content of 0.15% C makes it possible to guarantee sufficient hardenability in the most highly hot formed areas. Beyond a content of 0.5% by weight, the risk of the formation of defects is increased during hardening, in particular for the thickest parts. It also becomes difficult to guarantee ductility during the bending of parts after press hardening. A carbon content between 0.09 and 0.38% makes it possible to obtain a strength Rm between approximately 1000 and 2050 MPa when the microstructure of the part is completely martensitic.

in addition to its role as a deoxidizing agent, manganese also has a major effect on hardenability, in particular when its content by weight is greater than 0.5% and preferably greater than 0.8%. Nevertheless, it is preferable to limit its addition to 3% by weight, and very preferable to limit it to 1.5% to avoid excessive segregation.

The silicon content of the steel must be between 0.02 and 0.5% by weight, and preferably between 0.1% and 0.35%. In addition to its role in the deoxidation of the liquid steel, this element contributes to the hardening of the steel, although its content must nevertheless be limited to prevent the excessive formation of oxides and to avoid undesirable effects on the dip-coatability.

Above a level greater than 0.01%, chromium increases hardenability and contributes to achieving high strength after the hot forming operation. Above a concentration equal to 1% (preferably 0.3%), the effect of the chromium on the uniformity of the mechanical properties in the part is saturated.

Aluminum is an element that promotes deoxidation and the precipitation of nitrogen. In excessive quantity, coarse aluminates are formed during processing that tend to reduce the ductility, which is reason to limit the aluminum content to 0.25% by weight. A minimum content of 0.001% makes it possible to deoxidize the steel in the liquid state during processing.

In excessive quantities, sulfur and phosphorus lead to increased brittleness. That is why it is preferable to limit respective concentrations of these elements to 0.05 and 0.1% by weight.

Boron, the concentration of which must be between 0.0005 and 0.010% by weight, and preferably between 0.002 and 0.005% by weight, is an element that plays a major role in hardenability. Below a concentration of 0.0005%, a sufficient effect on hardenability is not achieved. The full effect is obtained for a concentration of 0.002%. The maximum boron content must be less than 0.010% and preferably 0.005% to avoid reducing toughness.

Titanium has a high affinity for nitrogen. It protects the boron so that this element is in free form so that it can exert its full effect on the hardenability. Above 0.2%, however, there is a risk of the formation of coarse titanium nitrides in the liquid steel that have an undesirable effect on its toughness. It is preferably between 0.02 and 0.1%.

Optionally, the steel can also contain calcium in a quantity between 0.0005 and 0.005%: by combining with oxygen and sulfur, the calcium makes it possible to prevent the formation of large inclusions, which have an undesirable effect on the ductility of the sheets or the parts fabricated from them.

The remainder of the composition of the steel consists of iron and the inevitable impurities resulting from processing, in particular oxygen, which is present in the form of oxides.

A preferred steel is 22MnB5 containing 0.20-0.25% C, 1.1-1.35% Mn, 0.15-0.35% Si, 0.02-0.06% Al, 0.02-0.05% Ti, 0.02-0.25% Cr, 0.002-0.004% B, the balance consisting of iron and unavoidable impurities.

The inventors have sought primarily the conditions that would make it possible to achieve good bendability after press hardening. This characteristic is measured by subjecting the part to a three-point bend. The part is bent progressively on rollers with three-point flexing, whereby the applied load is measured simultaneously. The critical bending angle $\alpha_c$ when cracks appear in the part is measured, whereby this phenomenon is accompanied by an instantaneous decrease in the applied load. Test conditions of this type are described in DIN VDA 238-100. For a breaking load Rm on the order of 1300-1600 MPa, a critical bending angle greater than 55° is required to satisfy the specifications. Preferably, even a critical bending angle greater than 60° is required to satisfy the most severe conditions of use.

Figure 2:
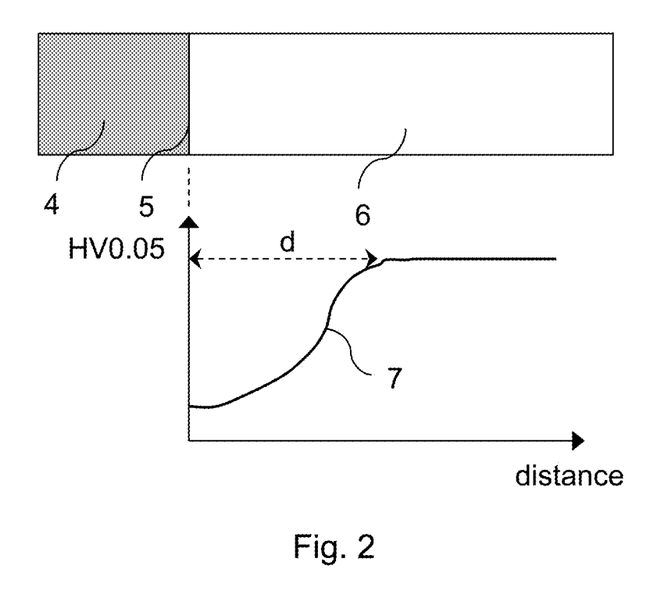
FIG. 2 schematically illustrates the definition of the depth of the soft area d measured by microhardness underneath the coating of a press hardened part.
Figure 4:
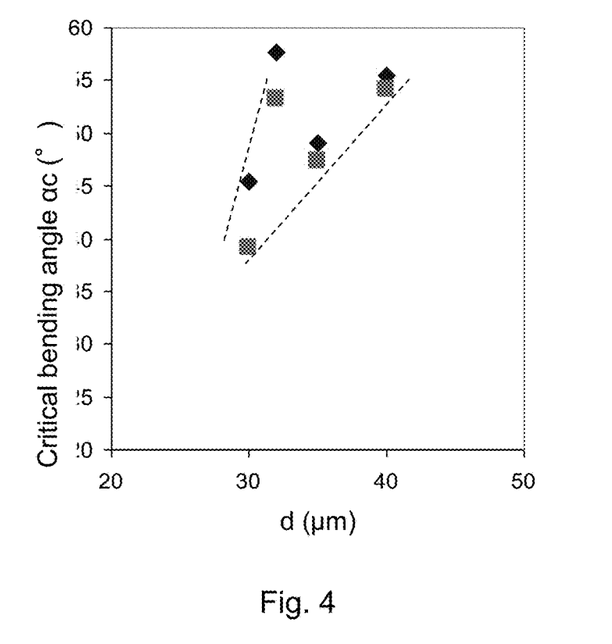
FIG. 4 illustrates the variation of the critical bending angle $\alpha_c$ of a press hardened part, as a function of the depth of the soft superficial area, whereby the latter is measured by micro-hardness under the coating.

By means of a fabrication process that will be described in detail below, the inventors have fabricated parts, starting with blanks of 22MnB5 steel 1.2 mm thick, galvannealed, hot stamped after heating to 880° C. and held at that temperature for 5 minutes, that differ only by the presence of a more or less large soft layer located underneath the coating. The process for the determination of the depth of this soft area is illustrated schematically in FIG. 2. After press hardening, the part consists of a steel substrate for heat treatment 6 and a coating 4 that is separated from the substrate by the interface 5. It should be noted that this diagram makes no attempt to reproduce the respective dimensions of the different areas. Hardness measurements are taken under a very low load (e.g., Vickers hardness under a load of 50 grams, HV0.05) in the substrate starting at the interface 5, to obtain the curve 7 illustrating the microhardness profile. From that, the value d that characterizes the depth of the soft area is obtained. FIG. 4 shows the critical bending angle $\alpha_c$ measured for values of d varying approximately between 30 and 40 micrometers. For a small depth of the soft area, the hot stamped parts will not satisfy the requirement $\alpha_c \geq 55°$. However, for deeper soft areas, it has been observed that the ratio is affected by wide scattering. For a given value of d, e.g., 35 micrometers, it is not possible to determine with certainty whether the hot stamped part will or will not satisfy the required criterion. It has also been observed that the microstructures corresponding to these variable-width soft areas are very similar after press hardening. In addition, the microstructure of these soft areas can be completely martensitic, i.e., it is not possible to easily distinguish them using conventional optic microscopy. In other words, the inventors have shown that neither the depth of the soft areas measured on the press hardened parts nor the optical microstructure observations of the soft areas of these parts are parameters that make it possible to reliably guarantee a minimum value for the bending angle.

Figure 3:
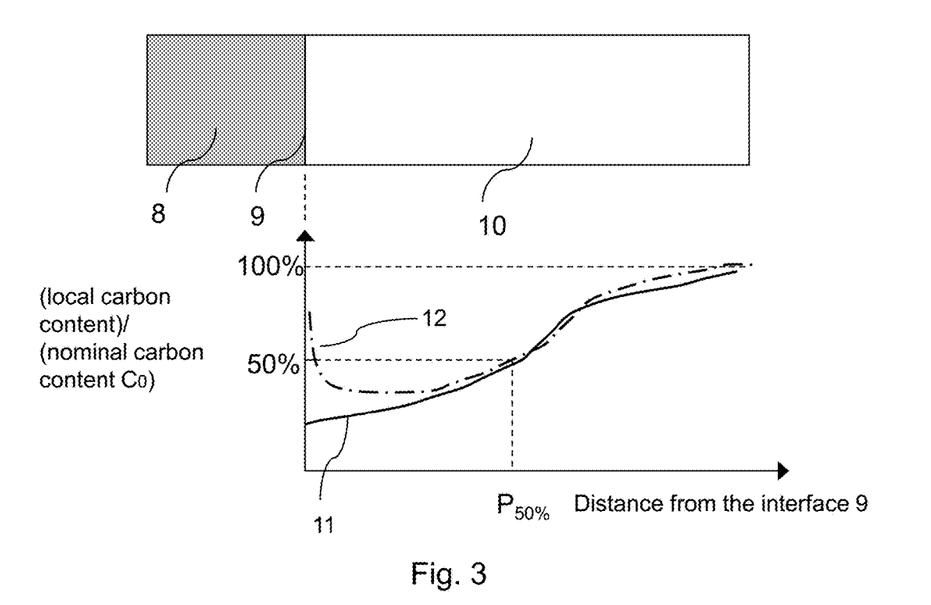
FIG. 3 schematically illustrates the definition, for a pre-coated sheet or blank, of the depth of decarburization of the surface $p_{50\%}$, measured by glow discharge optical emission spectroscopy, underneath the pre-coating of the sheet or blank before press hardening.
Figure 5:
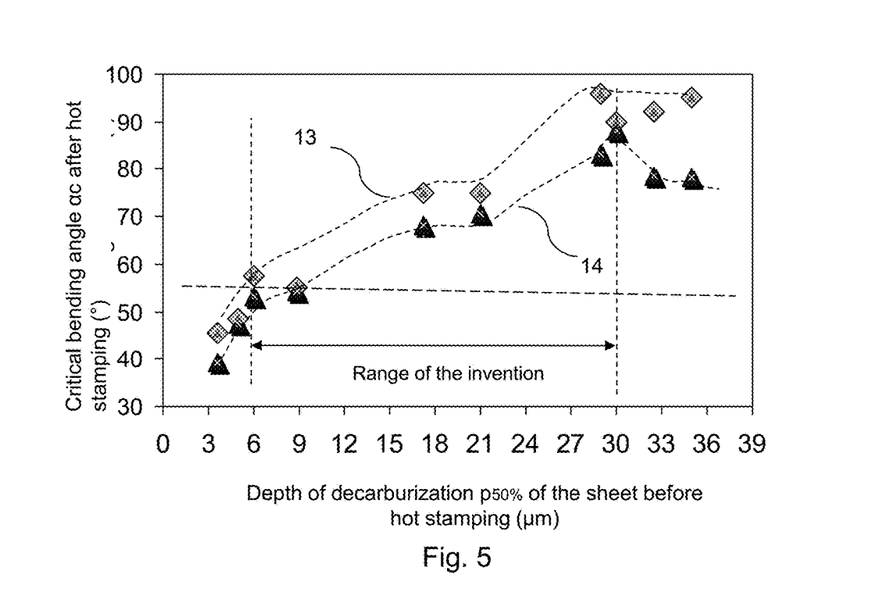
FIG. 5 illustrates the variation of the critical bending angle $\alpha_c$ of a press hardened part, as a function of the depth of decarburization $p_{50\%}$, the latter being measured on the pre-coated blank before hot stamping and hardening.

Surprisingly, the inventors have shown that to obtain the desired result it is necessary to determine the depth of decarburization not on the press hardened part but on the pre-coated sheet or blank before hardening. The determination process is illustrated in FIG. 3, the diagram of which does not attempt to reproduce the respective dimensions of the different areas to scale: the sheet or the blank is composed of a steel substrate 10 and a pre-coating 8 separated from the substrate by the interface 9. Starting from this interface, glow discharge optical emission spectrometry (GDOES), a technique that is in itself known, is used to measure the depth $p_{50\%}$ at which the carbon content is equal to 50% of the nominal carbon content $C_0$ of the substrate 10. The concentration profile can exhibit a regular decrease of carbon from the substrate to the interface (profile 11) or even a minimum located not far from the interface (profile 12). This latter case reflects a localized carbon enrichment near the extreme surface that in practice has no influence on the mechanical properties after hot stamping. In the case of the profile 12, the depth $p_{50\%}$ to be taken into consideration is located beyond this very superficial enrichment, as illustrated in FIG. 3. Thanks to a fabrication process that will be described in detail below, the inventors have fabricated parts, starting with galvannealed blanks of 22MnB5 steel 1.2 mm thick that differ only by the presence of a more or less large decarburized layer located underneath the coating. These sheets were cut to obtain blanks that were heated in the furnace to 880° C. for 5 minutes, then hot stamped to obtain the parts. These parts were subjected to bending tests, the results of which are illustrated in FIG. 5, whereby the flexing during the bending is exerted either in a direction parallel to the rolling direction (curve 13) or in a perpendicular direction (curve 14). In contrast to the results presented in FIG. 4, it should be noted that the depth of the decarburized area before press hardening makes it possible to satisfactorily predict the properties of the part after press hardening. To obtain a critical bending angle $\alpha_c \geq 55°$ (bending in the direction parallel to rolling), the depth of the decarburized area $p_{50\%}$ must not be less than 6 micrometers. For this condition to be satisfied, regardless of the orientation in relation to the rolling direction, the depth of the decarburization $p_{50\%}$ must not be less than 9 micrometers. To obtain a value $\alpha_c \geq 55°$, regardless of the orientation in relation to the rolling direction, the depth of the decarburization $p_{50\%}$ must not be less than 12 micrometers. Surprisingly, it has nevertheless been observed that beyond a depth $p_{50\%}$ of 30 micrometers, the bendability is not improved and even becomes slightly worse when the flexing is applied in the direction perpendicular to rolling. In addition, the difference in bendability between the directions parallel to and perpendicular to rolling has a tendency to increase. Therefore, to satisfy the mechanical requirements, the value of $p_{50\%}$ must be between 6 and 30 micrometers, preferably between 9 and 30, and very preferably between 12 and 30 micrometers.

The process according to the present invention-is described in greater detail below. First a steel for heat treatment is procured as described above. This steel is in the form of flat, cold rolled sheet. The annealing heat treatment explained below has the particular purpose of effecting a recrystallization of the microstructure work hardened by the cold rolling. After an optional degreasing and electrolytic cleaning to obtain a surface free of contamination, a depth of decarburization $p_{50\%}$ between 6 and 30 micrometers can be obtained by means of the following processes.

In a first embodiment, the sheet is subjected to a heat treatment as it travels through a radiant tube furnace, or a furnace heated by resistance, or by induction, or by any combination of these different means. These means offer the characteristic to adjust, independently of the heating means, the atmosphere prevailing in the different parts of the furnace. The furnace comprises a plurality of zones (preheating, heating, hold, cooling) where different temperature and/or atmosphere conditions prevail. The sheet is preheated to a temperature T1a in a zone where the atmosphere (designated A1) contains from 2 to 15% by volume hydrogen, preferably 3-5% by volume hydrogen, the balance being nitrogen and unavoidable impurities in the gas, with a dew point between −60 and −15° C. It is known that the dew point characterizes the oxidation potential of the atmosphere in question. The traveling sheet then passes into another zone of the furnace where, starting at a temperature T1a, water is injected in liquid or vapor form, or oxygen, or a combination of these different elements, to increase the dew point of the atmosphere. The injection must not be carried out at a temperature T1a less than 600° C., which would result in a low-temperature oxidation of the iron. The injection is preferably carried out at a temperature T1a greater than Ac1, the starting temperature of the austenitic transformation of the steel as it is heated. That is because, above this temperature, carbon is in solid solution in austenite, i.e., in a form more suitable for the decarburization phenomenon that is to take place. The injection is preferably carried out at a temperature T1a less than or equal to Ac1+40° C. This temperature range above Ac1 will be preferred to obtain a greater depth of decarburization $p_{50\%}$, e.g., greater than 9 or 12 micrometers. Beyond Ac1+40° C. there is a risk of increasing the austenitic grain size and of causing the formation of bainitic and/or martensitic compounds in the steel substrate during the cooling that follows the annealing.

The injection is carried out so that the dew point PR of the atmosphere A2a of this section of the furnace is between −15° C. and the temperature Te of the dew point of the iron/iron oxide thermodynamic equilibrium. In the temperature range in question, the iron oxide formed can be FeO or $Fe_3O_4$. The lowest equilibrium temperature Te corresponding to the formation of one oxide or the other will be selected. This temperature Te can be determined, for example, by reference to the publication: JANAF Thermomechanical Tables, 3rd Edition, Part II, Journal of Physical and Chemical Reference Data, Volume 14, 1985, Supplement No. 1, published by the American Chemical Society and the American Institute of Physics for the National Bureau of Standards. Under these injection conditions, a selective internal oxidation of certain additive elements present in the steel (Mn, Si, Al, Cr, Ti) is effected without any surface oxidation of the iron. The internal oxidation can have a depth extending to approximately 5 micrometers below the surface for Mn, Si, Al and Cr. There is an oxygen enrichment in this surface area, the average oxygen content of which is designated by $O_m$. If the nominal oxygen content of the steel substrate is designated by $O_0$, the ratio $O_m/O_0$ that characterizes the surface enrichment in oxygen is greater than 15.

The oxides are located between 0 and 5 micrometers below the interface between the pre-coating and the substrate. For a dew point PR higher than $-15°$ C., the density of oxides with a diameter greater than 1 micrometer in this area is greater than 50/mm$^2$. The diameter is defined as follows: starting with a metallographic section, the diameter of the circle that would have the same surface area is determined. It is known that oxides generally have an unfavorable influence on ductility on account of their role as sites of incipient failure. As explained below, the specific nature of the internal oxides formed under the conditions of the invention does not have any undesirable effect on the suitability for bending after press hardening.

Under these conditions, a superficial decarburization occurs. When the dew point is higher than the temperature Te of the dew point corresponding to the iron/iron oxide equilibrium, the atmosphere becomes oxidizing for iron. During the subsequent annealing steps, there is a potential risk of not completely reducing the iron oxide and causing the local appearance of coating defects corresponding to the local presence of unreduced superficial oxides. The temperature Te is a function of the temperature and concentration of hydrogen in the atmosphere. By way of illustration, for an atmosphere containing 97.5% nitrogen and 2.5% hydrogen, Te=+9° C. at 800° C. For an atmosphere containing 95% nitrogen and 5% hydrogen, Te=+18° C. at 800° C. The sheet then exits the section in which the injection was performed at a temperature T2$a$ which is between 720 and 860° C. and enters into a holding zone at a temperature Tm between T2$a$ and T2$a$+40° C. The interval of time between the instant when the sheet is at the temperature T1$a$ and the instant when it reaches the temperature T2$a$ must be at least 30 seconds to obtain a depth of decarburization $p_{50\%}$ between 6 and 30 micrometers.

Optionally, the atmosphere in the beginning of the holding zone can be identical to that of the preceding zone, i.e., it can have a dew point between $-15$ and Te. The sheet can then be cooled or it can be held at the temperature Tm under an atmosphere A3 containing from 2 to 15% by volume hydrogen, preferably 3-5% by volume hydrogen, the balance consisting of nitrogen and unavoidable impurities in the gas, with a dew point between $-60$ and $-15°$ C., these conditions being reductive for iron. The cooling step that follows is described below.

In a second embodiment, the fabrication process starts in a manner identical to the process described above, up to the step of the injection at the temperature T1$a$ between 600° C. and Ac1+40° C., preferably higher than Ac1. At this temperature a quantity of water, steam or oxygen is injected to obtain, in this zone of the furnace, an atmosphere designated A2$b$ which is oxidizing for iron. These conditions cause a complete oxidation of the surface, i.e., of the iron and of certain additive elements (Mn, Si, Al, Cr, Ti). Underneath this oxide layer, internal oxides of Mn, Si, Al, Cr or Ti are formed and an oxygen enrichment occurs. A superficial decarburization occurs at the same time as the oxidation of the iron. The sheet then exits the injection section at a temperature T2$a$ which is between 720 and 860° C. and enters a holding zone at a hold temperature Tm between T2$a$ and T2$a$+40° C. The interval of time between the instant when the sheet is at the temperature T1$a$ and the instant when it reaches the temperature T2$a$ must be at least 30 seconds to obtain a depth of decarburization $p_{50\%}$ between 6 and 30 micrometers. Beyond that, in the holding zone, the sheet is held at the temperature Tm in an atmosphere A3 which is reductive for iron, whereby the conditions are selected so that the complete reduction of the iron oxide layer occurs not later than the end of the hold at the temperature Tm. For this purpose, for example, an atmosphere containing from 2 to 15% by volume of hydrogen can be selected, preferably 3-5% by volume hydrogen, the balance consisting of nitrogen and unavoidable impurities in the gas, with a dew point between $-60$ and $-15°$ C. for a sufficient length of time for the complete reduction of the superficial iron oxide layer to occur in this zone. After the reduction of this iron oxide layer, the sheet contains oxides of Mn, Si, Al or Cr located between 0 and 5 micrometers beneath the surface, whereby the density of oxides with a diameter greater than 1 micrometer in this area is greater than 50/mm$^2$. The local oxygen enrichment is such that the ratio $O_m/O_0$ is greater than 15.

The cooling step that follows is described below.

In a third embodiment, the thermal cycle for the annealing of the sheet combines different means of heating; the pre-heating step is carried out in a zone of a direct-flame furnace ("DFF"). As it travels through the furnace, the sheet is preheated to a temperature T1$b$ between 550 and 750° C. in a zone where the atmosphere results from the combustion of a mixture of air and natural gas. According to an embodiment of the invention, the air/gas ratio is between 1 and 1.2, it being understood that the air-gas combustion in a stoichiometric ratio, is of 1. These pre-heating conditions result in the formation of a superficial layer of iron oxide, the thickness of which is between 0.10 and 0.25 micrometers. Underneath this oxide layer, internal oxides of Mn, Si, Al, Cr or Ti are formed and an oxygen enrichment occurs. At the exit from this pre-heating zone in the DFF furnace, the sheet enters a second furnace zone heated by radiant tubes (RTF) or by resistances, or by induction, or by any combination of these different means. The atmosphere contains from 3 to 40% by volume hydrogen, the balance consisting of nitrogen and unavoidable impurities, with a dew point of less than $-30°$ C. In this second zone, the sheet is heated to a temperature T2$b$ between 760 and 830° C. Preferably, T2$b$ is greater than Ac1, which makes possible a faster decarburization on account of the presence of carbon in solid solution in the austenite. The interval of time between the instant when the sheet is at the temperature T1$b$ and the instant when it reaches the temperature T2$b$ must be at least 30 seconds to obtain a depth of decarburization $p_{50\%}$ of between 6 and 30 micrometers. These conditions lead to a complete reduction of the superficial layer of iron oxide created in the preceding step, and to the intended superficial decarburization. After the reduction of this iron oxide layer, the sheet contains oxides of Mn, Si, Al or Cr located between 0 and 5 micrometers below the surface, whereby the density of oxides with a diameter greater than 1 micrometer in this area is greater than 50/mm$^2$. The local oxygen enrichment is such that the ratio $O_m/O_0$ is greater than 15.

The sheet then travels into a holding zone at a hold temperature Tm between T2b and T2b+40° C.

The rest of the process is identical in the three embodiments described above. The sheet is cooled to a temperature T3 in an atmosphere A4 so that no superficial re-oxidation of the iron occurs. For example, an atmosphere containing from 2 to 70% by volume hydrogen can be used, the balance consisting of nitrogen and unavoidable impurities in the gas, with a dew point between −60 and −30° C. The sheet that subsequently enters into the pre-coating bath is therefore completely free of superficial iron oxide. The temperature T3 is close to the temperature Tbm, the temperature of the pre-coating bath, to prevent a thermal disruption of the bath. For this reason, the temperature T3 will be between Tbm−10° C. and Tbm+50° C. Therefore, for a pre-coating with zinc, the temperature T3 will be between 450 and 510° C. For a pre-coating in an aluminum-silicon bath, the temperature T3 will be between 660 and 720° C.

The pre-coating can be aluminum or an aluminum-based alloy. In the latter case, the sheet can advantageously be obtained by continuous dipping in an aluminum-silicon alloy bath that contains, in percent by weight, 7-15% silicon, 3 to 20% iron, optionally between 15 and 30 ppm calcium, the remainder consisting of aluminum and the unavoidable impurities resulting from processing.

The pre-coating can also be zinc or a zinc alloy. In particular, it can be continuous hot dip galvanized ("GI"), containing 0.25-0.70% Al, 0.01-0.1% Fe, the balance being zinc and unavoidable impurities resulting from processing. The pre-coating can also be galvannealed ("GA"), containing 0.15-0.4% Al, 6-15% Fe, the balance being zinc and unavoidable impurities resulting from processing. The pre-coating can also be a zinc-aluminum-magnesium alloy containing 1-15% Al, 0.5-5% Mg, 0.01-0.1% Fe, the balance being zinc and unavoidable impurities resulting from processing. The pre-coating can also be an alloy containing 4-6% Al, 0.01-0.1% Fe, the balance being zinc and unavoidable impurities resulting from processing.

The pre-coating can also be an aluminum-zinc alloy containing 40-45% Zn, 3-10% Fe and 1-3% Si, the balance being zinc and unavoidable impurities resulting from processing.

The pre-coating can also be composed of a superposition of layers, e.g., after the deposition by dip coating of a layer of aluminum or aluminum alloy, one or more subsequent deposits of zinc or zinc alloy can be laid down, e.g., by electrodeposition or by vacuum deposition: PVD (Physical Vapor Deposition) and/or CVD (Chemical Vapor Deposition), whereby these deposition processes are known in themselves.

Figure 1:
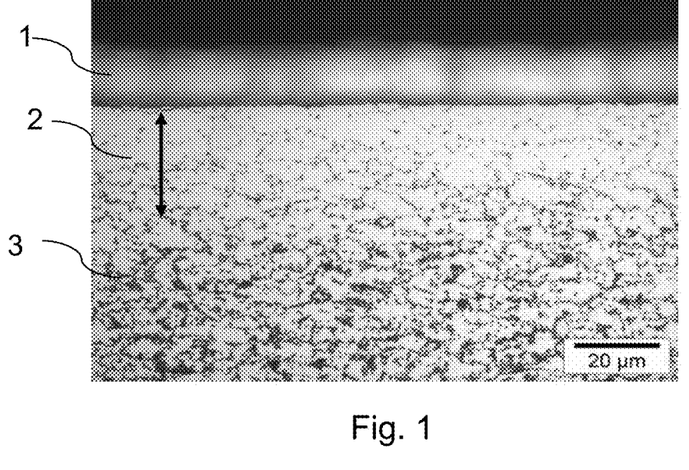
FIG. 1 shows the microstructure of a pre-coated steel sheet according to the present invention and intended for the fabrication of press hardened parts.

At this stage, by means of the processes described above, a sheet is obtained that is composed of a steel substrate, the depth of decarburization $p_{50\%}$ of which is between 6 and 30 micrometers, topped by a pre-coating, without a layer of iron oxide present between the substrate and the pre-coating. FIG. 1 presents an example of a sheet of this type, whereby the steel substrate 1 comprises a specific superficial decarburized area 2 topped by a galvannealed pre-coating 1.

This sheet is then cut to obtain a blank, the geometry of which is in a defined relation to the final geometry of the intended part. Optionally, it is possible to cold stamp the part to bring it more or less close to the final geometry of the intended part. In the case of a small cold deformation, the process can be supplemented by a hot deformation, as will be explained below.

This flat or pre-stamped blank is then heated to a temperature $T_R$ capable of conferring a partly or completely austenitic structure to the steel substrate. $T_R$ can be between $A_{c1}$ (temperature of the start of the austenitic transformation of the steel when heated) and $A_{c3}$ (temperature of the end of the austenitic transformation), in particular when the objective is to achieve bainitic-martensitic microstructures after cooling in the press. On the other hand, the temperature $T_R$ will be higher than $A_{c3}$ if the objective is a mostly martensitic microstructure in the final part. The blanks are preferably heated in a furnace under an ordinary atmosphere; during this step, alloying takes place between the steel of the substrate and the pre-coating. The term "pre-coating" is used to designate the alloy before heating, and "coating" the alloy layer formed during the heating that immediately precedes the hot stamping. The heat treatment in the furnace therefore modifies the nature of the pre-coating and its geometry because the thickness of the final coating is greater than that of the pre-coating. The coating formed by alloying protects the underlying steel from oxidation and additional decarburization and is appropriate for subsequent hot-shaping, in particular in a stamping press. The alloying occurs over the entire thickness of the coating. Depending on the composition of the pre-coating, one or more intermetallic phases are formed in this alloy layer and/or an alloy in the form of a solid solution. The iron enrichment of the coating results in a rapid elevation of its melting point. The coatings formed also have the advantage that they are adherent and suitable for the potential hot forming operations and rapid cooling that are to follow.

The blank is held at a temperature $T_R$ to ensure the uniformity of its internal temperature. Depending on the thickness of the blank, which can be in the range between 0.5 and 2.6 mm, for example, the hold time at the temperature $T_1$ [sic; $T_R$] can vary from 30 seconds to 15 minutes.

The heated blank is then extracted from the furnace and transferred to the tooling, whereby this transfer is performed rapidly so as not to cause the transformation of the austenite during cooling. In one variant embodiment, the blank is heated in the vicinity of the tooling, then hot formed without transfer. The blank is then hot stamped to obtain the final geometry of the part. Other modes of hot deformation are also possible, for example shaping between rollers, a process generally known as "roll shaping." If the blank has already been previously cold stamped, the step that follows the extraction of the blank from the furnace can be simply a conformation in a press tool. In this case, the conformation is characterized by a smaller force applied by the tooling on the part, and the purpose is to finish the final geometry of the part and to avoid potential deformations during cooling.

Optionally, it is also possible to heat only a portion of the blank, or to cool the stamped part differently in its different areas, in which case these variants result in parts that are hardened non-uniformly, whereby certain areas are significantly harder, while other areas have a lower mechanical strength but greater ductility.

After the stamping or conformation step, the part is held in the tooling, which may optionally be cooled, to ensure its effective cooling by thermal conduction.

Depending on the cooling rate and the hardenability of the steel of the substrate, the final microstructure is martensitic or bainitic-martensitic.

The following results, which are presented by way of a non-restrictive example, demonstrate the advantageous characteristics achieved by an embodiment of the invention.

EXAMPLE 1

A cold rolled sheet 1.2 mm thick is procured, the composition of which, expressed in percent by weight (%), is the following, with the remainder consisting of iron and unavoidable impurities resulting from processing:

| C | Mn | Si | Cr | Ti | Al | S | P | B | O |
|---|---|---|---|---|---|---|---|---|---|
| 0.22 | 1.17 | 0.24 | 0.19 | 0.040 | 0.032 | 0.003 | 0.013 | 0.003 | 0.0014 |

Figure 12:
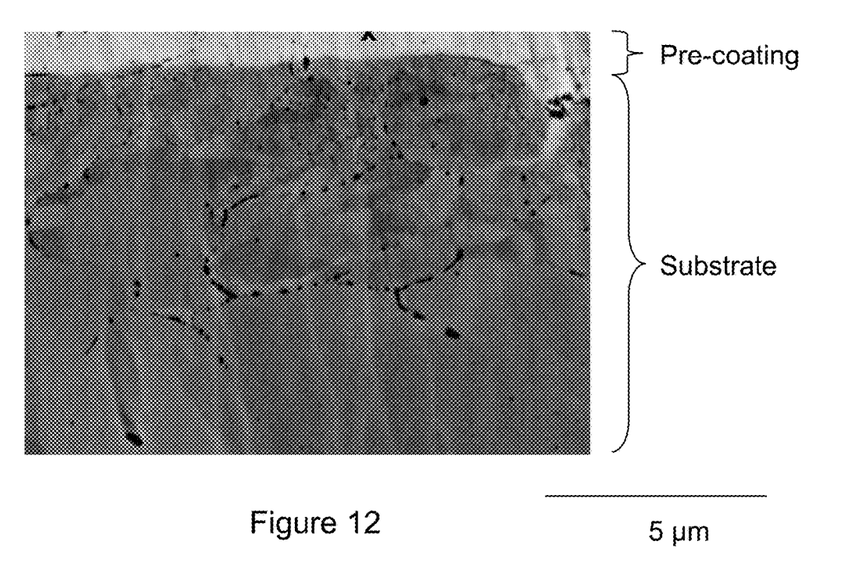
FIGS. 12 and 13 illustrate the internal oxides formed during the annealing in the steel substrate in the vicinity of the surface.
Figure 14:
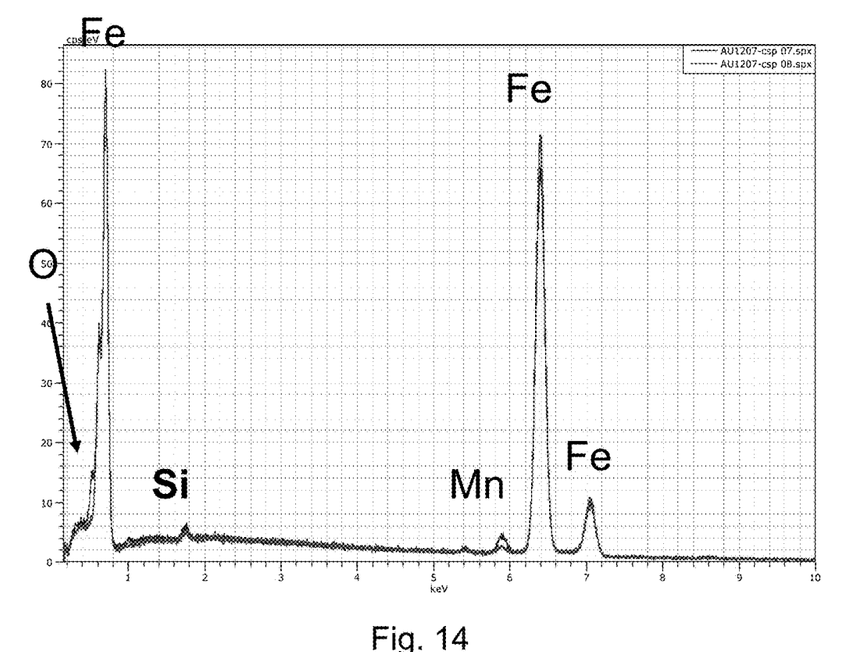
FIGS. 14 and 15 show two spectra of the energy dispersive X-ray spectroscopy of these oxides.
Figure 15:
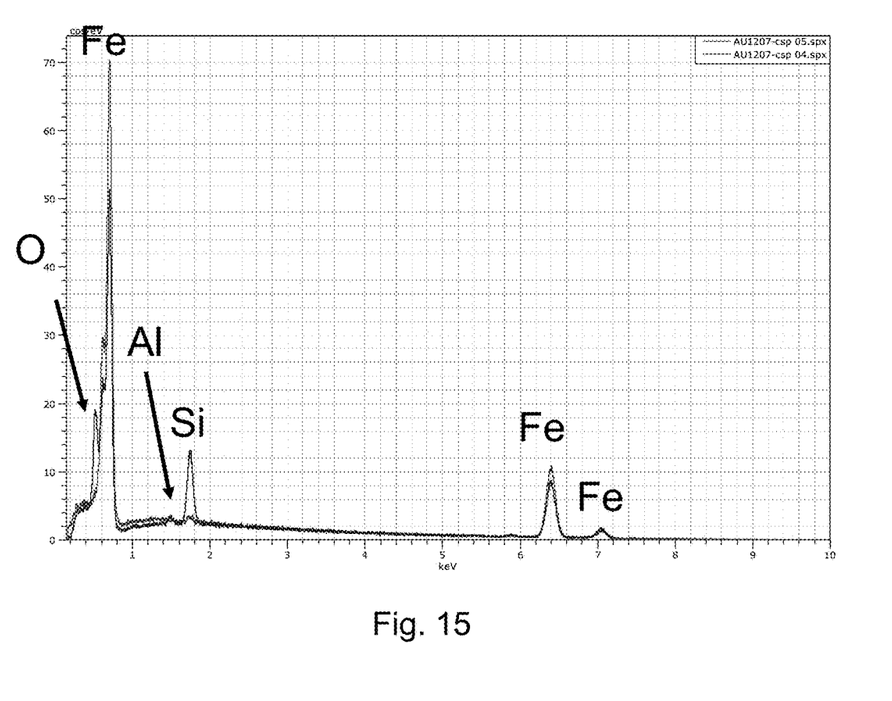

The temperature Ac1 of this steel composition is 724° C. The sheet is preheated as it travels through a radiant tube furnace under an atmosphere A1 of nitrogen containing 4.7% by volume hydrogen with a dew point of −31° C. to a temperature T1$a$ of 600° C., after which water is injected to obtain an atmosphere A2$a$ with a dew point PR. Different tests have been performed by modifying the flow of water injected into the furnace, to vary the dew point PR between −27° C. (obtained by means of the injection of a relatively large quantity of water) and +2° C. In all the tests, the sheet was then heated from the temperature T1$a$ to the temperature T2$a$ equal to 780° C. in the atmosphere A2$a$ for 110 seconds, which achieves a decarburization and a selective internal oxidation of Mn, Si, Al, Cr and Ti, whereby these oxides are formed in the immediate vicinity of the surface of the sheet. At the temperature T2$a$, the dew point of the iron/iron oxide equilibrium is +17° C. The sheet then enters a zone of the furnace where it is held at the temperature Tm of 780° C. under an atmosphere A3 containing nitrogen and 7% hydrogen, which is reductive for iron. The sheet is then cooled as it travels into another zone of the furnace under an atmosphere A4 containing 10% hydrogen, to a temperature T3 of 470° C., and pre-coated by dipping in a bath at the temperature Tm of 462° C. containing zinc and 0.125% aluminum as well as unavoidable impurities. No superficial re-oxidation of the iron occurs in the steps of holding and cooling in the atmosphere A4. Immediately after pre-coating, the sheet is reheated to a temperature of 540° C. to obtain a galvannealed pre-coating ("GA"), i.e., one containing 9% iron. The result is a sheet that does not contain a layer of iron oxide between the steel substrate and the galvannealed pre-coating. FIG. 12 illustrates the observations made under the conditions of an embodiment of the invention, oxides formed during selective internal oxidation, which are visible in the steel substrate immediately underneath the pre-coating. These oxides can be isolated or aligned along the grain boundaries. On the basis of an analysis of the ray energy dispersive spectroscopy of these oxides ("EDS"), it has been shown that they are oxides of manganese, silicon and aluminum as illustrated in FIGS. 14 and 15, which exhibit the characteristic peaks corresponding to these elements. The peak for iron is due to the matrix surrounding the oxides.

Figure 13:
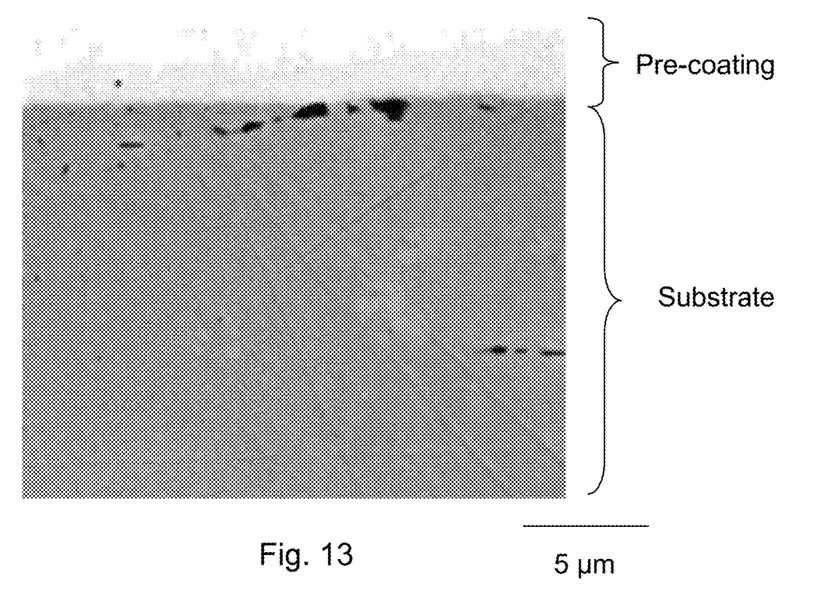

FIG. 13 illustrates the presence of oxides with a diameter greater than 1 micrometers, the density of which is greater than 50/mm$^2$ in the area located between 0 and 5 micrometers below the surface of the steel sheet.

Figure 16:
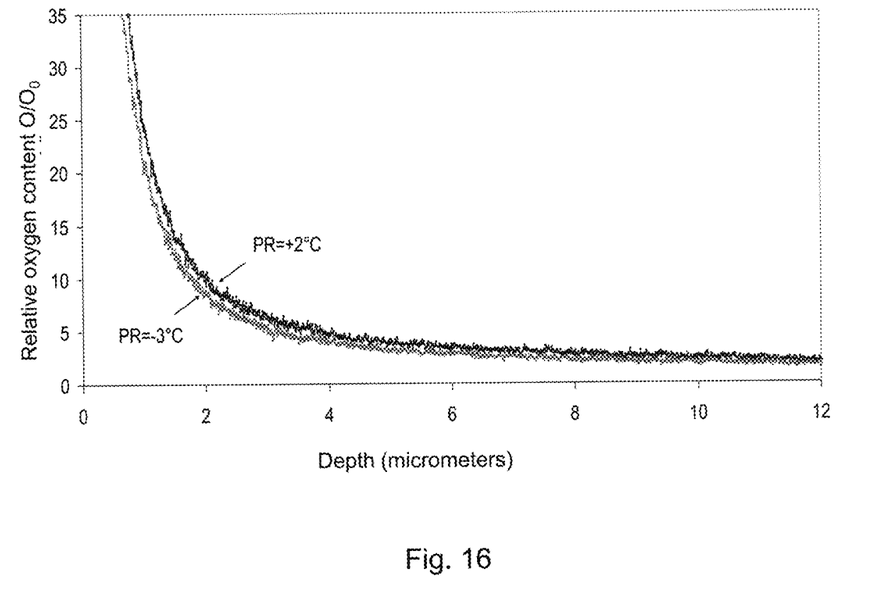
FIG. 16 shows the variation of the relative oxygen content $(O/O_0)$ under the pre-coating in sheet fabricated according to the present invention.

FIG. 16 illustrates the variation of the relative oxygen content (O/O$_0$) under the pre-coating in the substrate, measured by glow discharge optical emission spectrometry, whereby O$_0$ designates the nominal oxygen content of the substrate. This variation has been measured for values of the dew point PR of −3° C. and +2° C. The depth p=0 corresponds to the interface between the substrate and the pre-coating. In an area located between 0 and 5 micrometers below the surface of the substrate, there is an increase in the oxygen content corresponding to the presence of the oxides mentioned above. The local enrichment in oxygen in this area is such that the ratio O$_m$/O$_0$ is greater than 15. It is equal to 15.1 for PR=−3° C. and to 17.4 for PR=+2° C.

The pre-coated sheets are then cut to obtain blanks suitable for stamping. These blanks were heated to a temperature of 880° C. in a furnace under an ordinary atmosphere. After a hold time of five minutes in the furnace (including a period of 4 minutes for the heating phase), the blanks were extracted and immediately stamped. After hot stamping, the parts were cooled in the press at a rate greater than 30° C. per second to obtain a totally martensitic structure in the steel substrate. The ultimate tensile strength Rm obtained on the hardened parts is typically on the order of 1500 MPa.

The critical bending angle $\alpha_c$ of these parts was measured by a three-point bending test performed with two outside rollers with a diameter of 30 mm and a central blade with a very small radius.

Figure 6:
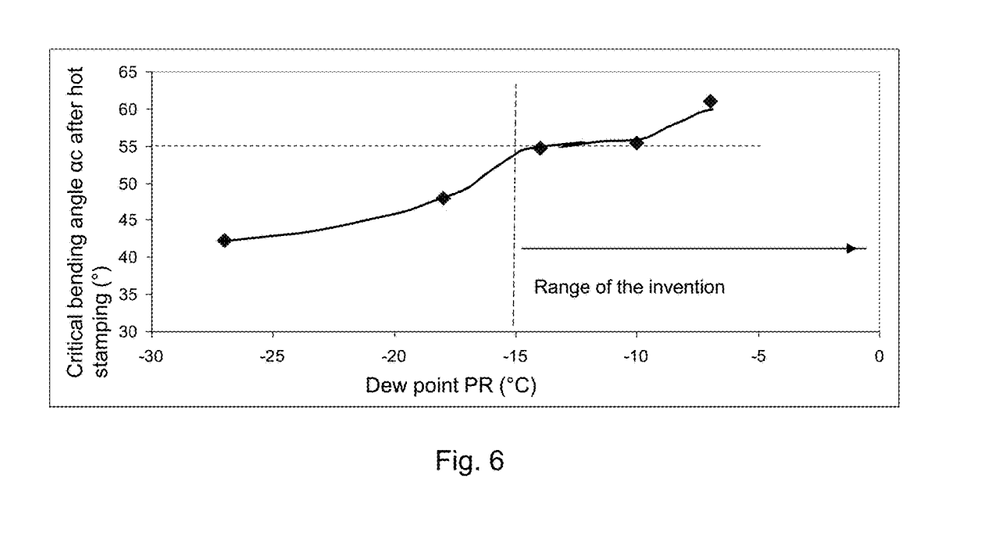
FIG. 6 shows the influence of the dew point in a particular zone of the furnace during the annealing before pre-coating on the critical bending angle of the part after hot stamping.

FIG. 6 illustrates the variation of the critical angle $\alpha_c$ as a function of the dew point PR after injection of water starting at the temperature T1$a$. When PR is less than −15° C., the bending angle obtained has an unsatisfactory value of less than 55°. When PR exceeds the temperature Te of +17° C., there is a potential risk of not completely reducing the iron oxide during the subsequent hold, and causing the local appearance of coating defects corresponding to the local presence of unreduced superficial oxides. In the range of an embodiment of the invention, the bending angle varies little as a function of the dew point. Between −15 and −7° C., the average increase is 0.79° per ° C., while the variation is greater below −15° C. (1.05° per ° C.). When PR is between −15 and −10° C., a particularly interesting range is detected, because the bending angle is practically independent of the dew point. In other words, in this particular range, any potential undesirable fluctuation of the quantity of water injected during the annealing into the furnace has no consequence on the suitability for bending after hot stamping, which makes it possible to guarantee a high degree of stability of the characteristics of the stamped and press hardened parts. It can also be observed that this good bendability is obtained in spite of the presence of oxides formed below the pre-coating. Without being bound to a theory, it is thought that the incipient damage starting from these oxides has a tendency to be delayed by the intrinsic toughness of the area with reduced carbon content in which they are located.

Figure 7:
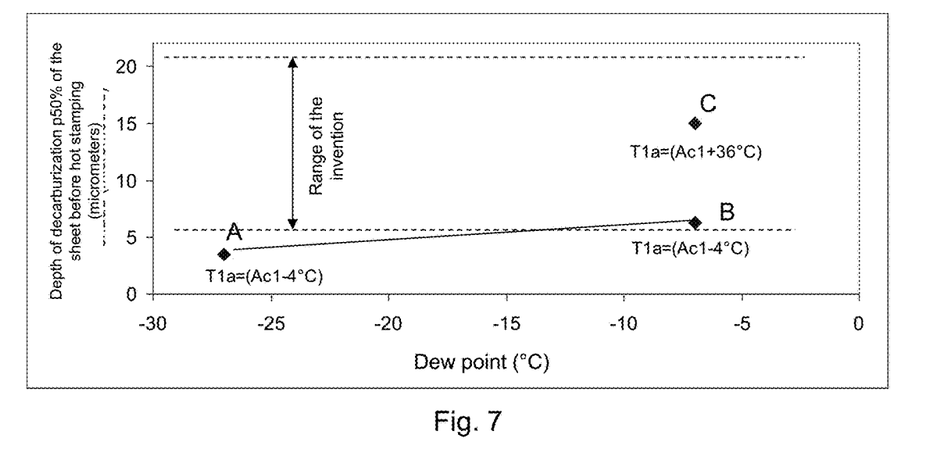
FIG. 7 shows the influence of the dew point in a particular zone of the furnace during the annealing before pre-coating on the depth of decarburization $p_{50\%}$, whereby this latter parameter is measured on the pre-coated blank before hot stamping and hardening.

Tests have also been performed by simultaneously varying PR and the temperature T1$a$, whereby the latter is 720° C. (i.e., Ac1−4° C.) or 760° C. (Ac1+36° C.). FIG. 7 illustrates the influence of the temperature T1$a$ and of the dew point PR on the depth of decarburization p$_{50\%}$ before hot stamping, measured by glow discharge optical emission spectroscopy. When the dew point is too low, the decarburized depth does not reach the value required by an embodiment of the invention (result marked "A" in FIG. 7). A sufficiently high dew point, with a temperature T1$a$ slightly below Ac1, makes it possible to achieve the required depth (result "B"). Heating to a higher temperature T1$a$ (Ac1+36° C.) makes it possible to significantly increase the depth of decarburization p$_{50\%}$ (result "C").

Figure 8:
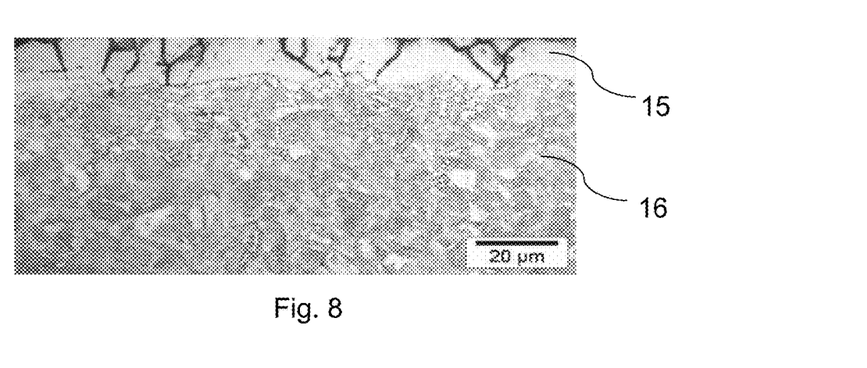
FIG. 8 shows the microstructure of the steel underneath the zinc coating, after press hardening, for a dew point of −27° C.
Figure 9:
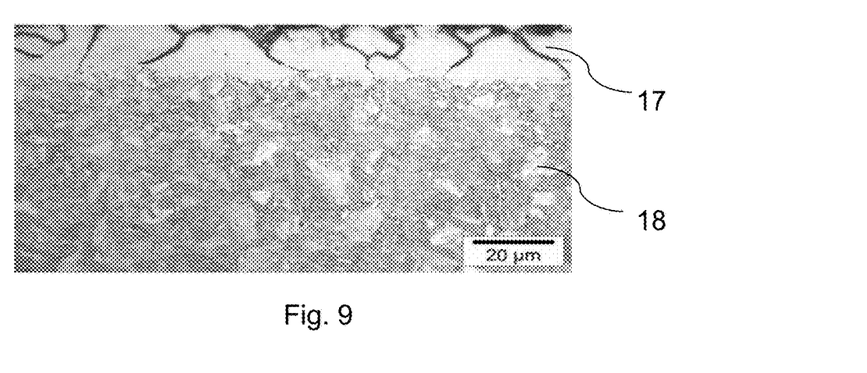
FIG. 9 also shows the microstructure of the steel underneath the zinc coating, after press hardening, for a dew point of −7° C.

After the hot stamped parts obtained were polished and etched using the reagent Nital, the microstructure under the coating that results from the alloying by diffusion between the zinc of the initial pre-coating and the steel of the substrate was observed using optical microscopy. FIG. 8 also illustrates the coating 15 and the underlying steel 16 for an annealing with a dew point PR=−27° C. FIG. 9 illustrates the coating 17 and the underlying steel 18 for an annealing with a dew point PR=−7° C. In spite of the significant difference in bendability between the two specimens)(20°), no significant micro-structural differences were detected between the two specimens after hot stamping, in spite of the difference of decarburization existing between them before hot stamping.

Figure 10:
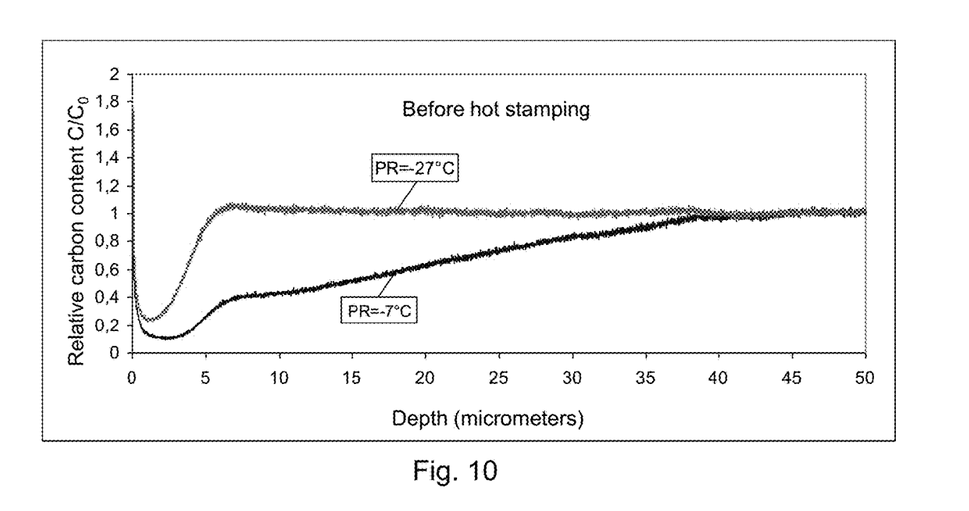
FIG. 10 illustrates the variation, before hot stamping, of the carbon content of the steel substrate of two pre-coated steel sheets in the vicinity of their interface with the pre-coating, whereby the annealing of the sheets was carried out in an atmosphere A2a with a dew point of −27° C. or −7° C.

FIG. 10 illustrates the variation, before hot stamping, of the carbon content of the two sheets annealed in an atmosphere A2*a* with the dew point PR of −27° C. or −7° C. This variation, measured by glow discharge optical emission spectrometry in the steel substrate, is expressed in FIG. 10 as a function of the depth below the interface between the steel and the pre-coating. The measured local content (C) was determined in relation to the nominal carbon content $C_0$ to obtain the variation of the relative carbon content $C/C_0$. It should be noted that the decarburized areas are very different under the two annealing conditions, whereby the depth of decarburization $p_{50\%}$ is 15 micrometers for PR=−7° C. and 3 micrometers for PR=−27° C. If we consider the totality of the decarburized area, the depth of decarburization measured after annealing with PR=−7° C. is greater by approximately 35 micrometers than that measured after annealing at PR=−27° C.

Figure 11:
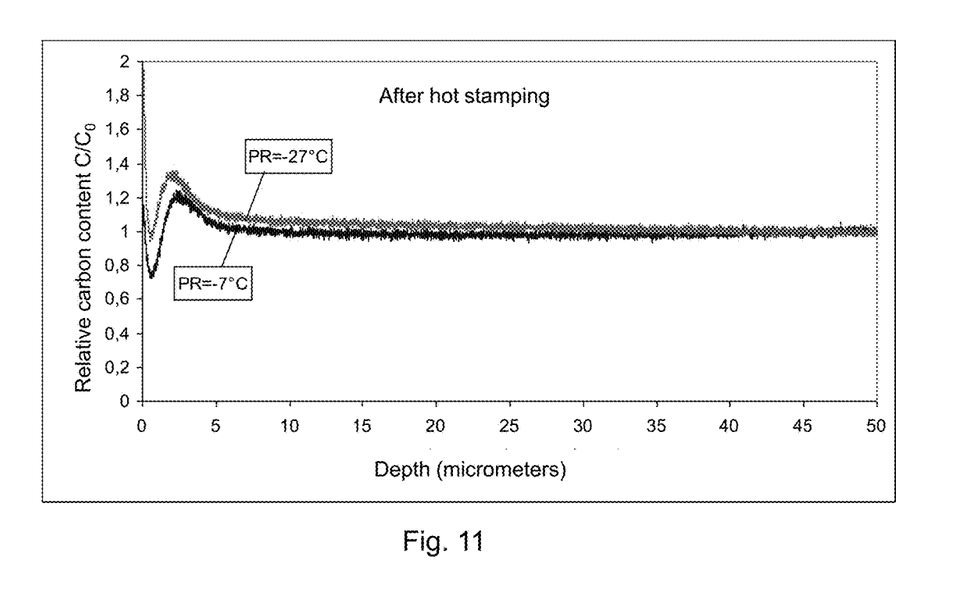
FIG. 11 illustrates the variation of the carbon content of two hot stamped steel parts in the vicinity of the interface with the coating of these parts, whereby the annealing of the sheets used for the fabrication of these parts was carried out in an atmosphere A2a with a dew point of −27° C. or −7° C.

After hot stamping of the sheets, the same process was used to determine the variation of the carbon content under the coating of the parts thus obtained. FIG. 11 illustrates the variation of the relative carbon content $C/C_0$ of these parts. It can thereby be shown that the decarburized area is essentially identical under the two annealing conditions.

That indicates that the heating in the furnace prior to the press hardening treatment leads to a diffusion of carbon toward the decarburized surface of the steel. The determination of the decarburization after hot stamping does not make it possible to determine that the annealing with PR=−7° C. will lead to satisfactory bending results, while the annealing at PR=−27° C. will not achieve the required level. Although incomplete, this homogenization of the carbon makes it possible, however, to obtain, in the steel located immediately beneath the coating, a sufficient carbon content to cause a martensitic hardening under the cooling conditions linked to the hot stamping, as illustrated in FIGS. 8 and 9. However, the intrinsic toughness characteristics of the martensite created under these conditions depends on the decarburization conditions which result in particular from the choice of the temperature PR. Therefore, the effective testing of the suitability for bending of the hot stamped parts must be performed on the sheets or the blanks before the hot stamping operation and not after, contrary to what would be expected by a person skilled in the art.

In addition, the hot stamped parts fabricated from the sheets pre-coated with zinc or zinc alloy decarburized according to an embodiment of the invention display a particular aptitude for welding by spot welding. It appears that, after heating and hot stamping, there is a decarburized layer beneath the coating. It is known that resistance welding leads to a very large local temperature elevation because the fusion is achieved in the molten core that constitutes the joint between the welded components. In welded joints executed on conventional hot stamped parts, there is an embrittlement of the austenitic grain boundaries by penetration of the zinc of the coating, which is then liquid on account of the temperature elevation during the welding. According to an embodiment of the invention, the presence of an area in which the carbon is very depleted under the coating leads to a local increase in the transformation temperature Ac3 into austenite during the heating. Depending on the carbon content, the structure at high temperature is then constituted by a ferrite microstructure or by a mixture of ferrite and austenite. In the presence of liquid zinc, this microstructure displays a reduced sensitivity to cracking compared to the austenitic structure.

EXAMPLE 2

Sheets pre-coated with zinc using the process described above were fabricated, with the exception that the sheets have a thickness of 1.8 mm and were not reheated to 540° C. after hot-dip coating, as a result of which their coating is galvanized and not galvannealed.

The fabrication conditions were selected to obtain a sheet with a decarburized depth $p_{50\%}$ of 6 micrometers. The sheets were cut to obtain blanks that were austenitized at a temperature of 880° C. in a furnace under an ordinary atmosphere. After a total hold time of up to 10 minutes in the furnace, the blanks were extracted, immediately hot stamped and press hardened. The following table indicates the variation of the critical bending angle $\alpha_c$ as a function of the total hold time of the part in the furnace.

| Hold time (minutes) | Bending angle $\alpha_c$ (°) |
| --- | --- |
| 5.5 | 57.5 |
| 7 | 55 |
| 10 | 54 |

It therefore appears that the blanks can remain in the furnace up to 7 minutes before being hot stamped, while still meeting the requirements. This makes it possible to solve the problems encountered on hot stamping lines, when an incident on the line makes it necessary to keep the blanks in the furnace longer than planned. The present invention makes this flexibility possible, thereby eliminating the unnecessary rejection of the blanks. It can also be observed that beyond 7 minutes, the increase in hold time leads only to a very small decrease in the bending angle, which indicates that the process-according to an embodiment of the invention guarantees a high level of safety, in the event of a drift in relation to the nominal heat treatment parameters during the hot stamping, and makes it possible to achieve a high degree of reproducibility of the mechanical characteristics of the parts.

Therefore, the invention makes possible the fabrication of pre-coated sheets and coated parts with very high strength characteristics and bendability and with good isotropy, under very satisfactory economic conditions. These parts can advantageously be used as structural or reinforcement parts in the field of automobile construction.

What is claimed is:

1. A precoated, cold-rolled and annealed sheet with a thickness between 0.5 and 2.6 mm for the fabrication of press hardened parts, comprising:
    a steel substrate for heat treatment with a carbon content $C_0$ between 0.07% and 0.5%, expressed by weight;
    a metal pre-coating on at least the two principal faces of the steel substrate, the metal pre-coating being aluminum, an aluminum alloy, zinc or a zinc alloy, or is composed of a layer of aluminum or an aluminum-based alloy topped by a layer of zinc or a zinc alloy;
    a composition of the steel substrate contains, expressed in percent by weight:

$0.07\% \leq C \leq 0.5\%$;

$0.5\% \leq Mn \leq 3\%$;

0.02% ≤ Si ≤ 0.5%;

0.01% ≤ Cr ≤ 1%;

Ti ≤ 0.2%;

Al ≤ 0.25%;

S ≤ 0.05%;

P ≤ 0.1%;

0.0005% ≤ B ≤ 0.010%; and a remainder of the composition being iron and the unavoidable impurities resulting from processing;

the steel substrate including a decarburized area on the surface of each of the two principal faces, the depth $p_{50\%}$ of the decarburized area being between 6 and 30 micrometers, $p_{50\%}$ being the depth at which the carbon content is equal to 50% of the content $C_0$, the sheet not including a layer of iron oxide between the substrate and the metal pre-coating, and the steel substrate having an oxygen content $O_0$ and having, underneath an interface between the pre-coating and the substrate, at a depth located between 0 and 5 micrometers starting from the interface, an average oxygen content $O_m$, whereby $O_m/O_0$ is greater than 15.

2. The pre-coated sheet as recited in claim 1, wherein the composition of the steel substrate contains, expressed in percent by weight:

0.09% ≤ C ≤ 0.38%;

0.8% ≤ Mn ≤ 1.5%;

0.1% ≤ Si ≤ 0.35%;

0.01% ≤ Cr ≤ 0.3%;

0.02% ≤ Ti ≤ 0.1%;

0.001% ≤ Al ≤ 0.25%;

S ≤ 0.05%;

P ≤ 0.1%;

0.002% ≤ B ≤ 0.005%; and the remainder of the composition being iron and the unavoidable impurities resulting from processing.

3. The pre-coated sheet as recited in claim 1, wherein the composition of the steel substrate contains, expressed in percent by weight, 0.15% ≤ C ≤ 0.25%.

4. The pre-coated sheet as recited in claim 1, wherein the substrate contains, in an area located between 0 and 5 micrometers below the interface between the pre-coating and the substrate, oxides that include at least one element selected from a group consisting of titanium, silicon, manganese, aluminum, chromium, a density of the oxides with a diameter greater than one micrometer in this area is greater than 50/mm².

5. The pre-coated sheet as recited in claim 1, wherein the composition of the steel substrate includes 0.0005% ≤ Ca ≤ 0.005%.

6. The pre-coated sheet as recited in claim 2, wherein the composition of the steel substrate includes 0.0005% ≤ Ca ≤ 0.005%.

* * * * *